Aug. 18, 1936. J. G. ALTHER Re. 20,066
HYDROCARBON OIL CONVERSION
Original Filed Nov. 4, 1929
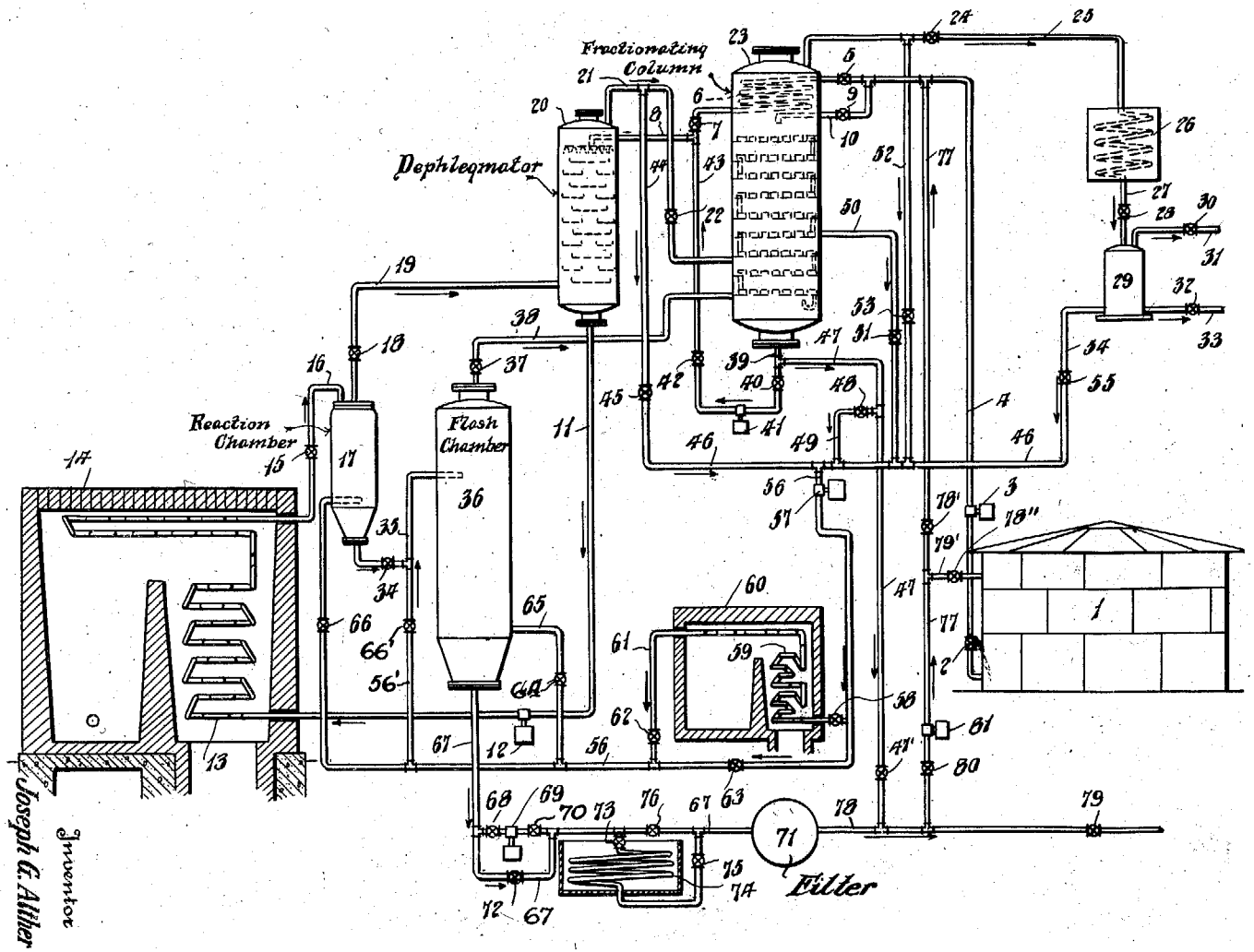
Inventor
Joseph G. Alther
By Frank L. Dellkamp
Attorney Reissued Aug. 18, 1936

Re. 20,066

UNITED STATES PATENT OFFICE 20,066

HYDROCARBON OIL CONVERSION

Joseph G. Alther, Chicago, Ill., assignor, by mesne assignments, to Universal Oil Products Company, Chicago, Ill., a corporation of Delaware Original No. 1,991,440, dated February 19, 1935, Serial No. 404,629, November 4, 1929. Application for reissue April 11, 1935, Serial No. 15,915

12 Claims. (Cl. 196—48)

This invention relates to the art of treating hydrocarbon oils and is particularly directed to the conversion of relatively high boiling oils into low boiling products of a more valuable nature.

When heavy oils which contain or produce upon substantial conversion a product containing objectionable quantities of pitchy or finely divided carbonaceous material are cracked by ordinary means, maximum conversion is restricted and consequently the production of light products such as those suitable for motor fuel is penalized if the resulting residual oil is to be of such nature that it will meet specifications for a good quality commercial fuel.

The present invention provides for a substantial production of the more valuable light products and at the same time permits the production of marketable fuel as a residual product. The purpose of the invention is two-fold—first to obtain the maximum desirable conversion of the oil undergoing treatment thereby obtaining a high yield of the most valuable products from the cracking reaction, and second, to retard and minimize the formation of those components in the residual oil which are detrimental to its use as a fuel or for reconversion and to remove or change the character of such components which may be formed. Both objects in part may be accomplished by the reconversion of various intermediate products from the first cracking reaction under conditions more suitable than those maintained in the first cracking zone. The second object may be further fulfilled by blending with the residual products some of the more refractory intermediate or final products either from the first or the second cracking reactions and to cool, if necessary, and filter the resulting blended residual material and finally to again blend the filtered residual product with an intermediate product from within the system. In this way a residual product may be obtained which may be marketable as a fuel or may be suitable for reconversion in the same or another process. This blending may be done either in the reaction chamber or in the flash chamber and the blending material may be either relatively hot or cold, may be in a vaporized or a liquid state or partially in either state and may be a final or intermediate product of the process.

In the process which constitutes my invention both of the above mentioned purposes may be accomplished simultaneously, each augmenting and assisting the other.

In the drawing forming a part hereof there is shown in side elevation an apparatus partially in cross section wherein the process of my invention may be practiced.

Oil is fed from supply tank 1, through valve 2, pump 3, line 4, valve 5, preheating coil 6, valve 7 and line 8, into dephlegmator 20. A portion or all of this charging stock may pass through valve 9 and line 10 directly into fractionating tower 23. That portion of the preheated charging stock not vaporized in dephlegmator 20 may pass together with the reflux from the bottom of dephlegmator 20, through line 11 and pump 12 into the heating element 13. Heating element 13 is located in any suitable furnace 14 and the oil passing therefrom having been heated to the desired outlet temperature may pass into reaction chamber 17, through valve 15 and line 16. Vapors from reaction chamber 17 may pass through valve 18 and line 19 into the bottom of dephlegmator 20 where, after being cooled and fractionated, the portion thereof still uncondensed at the top of the dephlegmator may pass through line 21 and valve 22 into the fractionating tower 23. In this secondary fractionating tower the vapors are further fractionated and cooled and the final light products from the system emerge as vapor through line 25 and valve 24, pass through condenser 26 where they are condensed and cooled. thence through line 27 and valve 28 into receiver 29. From receiver 29, the uncondensed gases may be drawn off through valve 30, in line 31, and the pressure on the receiver controlled thereby. Liquid may be withdrawn from the receiver to storage or elsewhere through line 33 controlled by valve 32. Required connections for feeding back this final liquid product to the top of fractionating tower 23 or dephlegmator 20 are well known to the art and are not shown in the drawing. This may be done, however, to assist cooling and fractionation in either tower. Liquid from the bottom of reaction chamber 17 may be withdrawn through valve 34 and line 35 into a vaporizing zone or flash chamber 36. Pressure may be reduced through valve 34 so that flash chamber 36 may be maintained at a substantially lower pressure than that in reaction chamber 17, and the latent heat from the oil which passes into the flash chamber 36 may thus be utilized for its vaporization. Vapors from the flash chamber emerge through valve 37 and pass through line 38 into the bottom of the fractionating tower 23. Liquid which collects in the bottom of fractionating tower 23 is drawn off through line 39 and may be pumped wholly, or in part, by means of pump 41 through valve 40, valve 42 in line 43 and into line 8 from which it may pass into dephlegmator 20.

A portion of the vapors from the top of dephlegmator 20 may be drawn from line 21 through line 44 and valve 45 into the header 46. In the same manner a portion of the vapors from the top of fractionating tower 23 may be withdrawn from line 25 through line 52 and valve 53 into the header 46. A side stream from the fractionating tower 23 may pass through line 50 and valve 51 into the header 46. A portion or all of the liquid from the bottom of fractionating tower 23 may be diverted from line 39 through line 47, valve 48 and line 49, into the header 46. A portion of the liquid product from receiver 29 may be withdrawn through line 54 and valve 55 and passed into the header 46. Any or all combinations of these products entering the header 46 may be picked up by pump 57 and passed through line 56, valves 63 and 66, into reaction chamber 17, or by partially or totally closing valve 66 and partially or totally opening valve 66', a portion or all of these products may pass through line 56', through line 35 and into the flash chamber 36. Similarly valve 64 may be partially or totally opened and valves 66 and 66' partially or totally closed so that all or any portion of the material from line 56 may pass through valve 64 and line 65 directly into flash chamber 36. It may be desired to further convert certain of the products or certain combinations of the products which may enter the header 46. In this case valve 58 is opened, valve 63 is closed and the desired products pass through the heating element 59 which is located in a suitable furnace 60. The heated or unreconverted products, as products from header 46 may be controlled by the conditions maintained within the heating element 59 and the temperature in furnace 60. When it is desired to simply add heat to the products from header 46, this may be accomplished by maintaining a lower temperature in furnace 60. The heated or reconverted products, as the case may be, emerge from the heating element 59 and may pass through line 61 and valve 62, back into line 56—from line 56 the heated or reconverted products may pass into reaction chamber 17 or into flash chamber 36 or both in any or all of the manners previously described.

Liquid from the bottom of flash chamber 36 which may have been previously blended with any of the products above mentioned either in reaction chamber 17 or in the line 35 between reaction chamber 17 and flash chamber 36, directly in flash chamber 36 or in all or any combination of these, may be withdrawn through line 67, valve 68, pump 69, valves 70 and 76, through filter 71, line 78 and valve 79, to storage or elsewhere. In case sufficient pressure is maintained on the flash chamber 36, pump 69 may be unnecessary and if so, may be bypassed by opening valve 72 in line 67 and closing valves 68 and 70. It is often desired to partially cool certain types of residual oils before they are filtered as partial cooling may render the carbon, pitchy and asphaltic materials in the residual oil less soluble and filtration may thereby be facilitated. When cooling is desired it may be done to any desired degree by closing the valve 76, opening valve 73, and passing the residual oil through cooler 74 and valve 75 back into line 67. Filter 71 may be of any suitable type such as will retain the carbon, pitchy and asphaltic material suspended in the blended material and permit the passage of the relatively clean residual liquid. The filter 71, for example, may contain a bed of absorbent material such as fuller's earth, bone black or the like, or may employ a filtering medium such as cotton duck, Monel metal cloth, or others. Several filters may be used ultimately if necessary to permit uninterrupted operation.

The diluted and filtered residual oil may, if desired, be further diluted by liquid from the bottom of fractionating tower 23, any portion of which may pass from line 47 through valve 47' into line 78. By the judicial use of the blending materials before filtering and this diluent after filtering a relatively clean residual product may be produced having a viscosity which may be regulated over a wide range. When it is desired to produce an oil of relatively low viscosity this method permits filtering before the degree of dilution is such as to render the carbon, pitchy or asphaltic materials difficult to filter out and provides for final blending to the desired viscosity after filtration.

The residual product from the process may, if desired, be re-processed in the same apparatus and to do this, all or a portion of the residual product may pass from line 78, through valve 80, pump 81, line 77 and valve 78'' in line 79' into tank 1 where it may mix with the charging stock or it may pass in whole or in part through line 77 and valve 78' directly into line 4 where it may also mix with the charging stock.

The following is given as an example of the operation of my process.

Operating on a charging stock of 26° A. P. I. mixed base topped crude oil the combined feed from the bottom of dephlegmator 20 was fed to the heating element 13 under a pressure of approximately 350 pounds per square inch and the outlet temperature of heating element 13 was maintained at approximately 910° F. Reaction chamber 17 was held at a pressure of approximately 225 pounds per square inch and at a temperature of approximately 865° F. Dephlegmator 20 was also maintained at a pressure of about 225 pounds per square inch and a top temperature of about 575° F. Vapors entering the secondary fractionating tower 23 were reduced through valve 22 to approximately 50 pounds per square inch and the outlet temperature at the top of this tower was about 400° F. All of the bottoms from the secondary fractionating tower 23 were re-processed through heating element 59 under a pressure of approximately 500 pounds per square inch and an outlet temperature of approximately 980° F. The reconverted bottoms from the secondary fractionating tower 23 were introduced into the residual oil in the bottom of reaction chamber 17 through line 56. Residual oil from reaction chamber 17 entered the flash chamber 36 through line 35, the pressure being reduced through valve 34. The flash chamber was maintained at a pressure of approximately 60 pounds per square inch. The distillate withdrawn from receiver 29 represented 65% of the charging stock. This product fell within the boiling range of finished motor fuel having an initial boiling point of 102° F., an end point of 437° F., and a gravity of 56° A. P. I. After chemical treatment this product showed an anti-knock value equal to a benzol equivalent of 40. Residuum withdrawn from flash chamber 36 after filtering and blending had a gravity of 11° A. P. I., a viscosity of 84 seconds at 122° F., Saybolt furol and showed a B. S. content (material insoluble in benzol) of approximately 0.8%. Before filtering this residuum contained about 2.5% B. S.

From the foregoing it will be seen that under certain conditions I have been able to produce by my process a high yield of the more valuable products suitable for motor fuel having a high antiknock rating and at the same time have held the residual product to specifications which render it suitable for sale or use as a premium fuel oil.

Having thus described my invention, what I claim is:

1. In processes for cracking oil in which the oil is subjected to pressure distillation in a pressure distillation zone, the vapors and unvaporized residue separately removed from the pressure distillation zone, the vapors subjected to fractionation and the unvaporized oil to further distillation by its contained heat in a zone of lower pressure than the pressure prevailing in the pressure distillation zone, the improvement which comprises subjecting reflux condensate formed in the fractionation to drastic cracking temperature and pressure conditions and then introducing portions of said reflux condensate to said pressure distillation zone and said zone of lower pressure, and uniting and subjecting to common condensation vapors released from said zone of lower pressure and vapors taken off from the zone of pressure distillation.

2. A hydrocarbon oil cracking process which comprises passing the oil through a heating zone and heating the same therein to cracking temperature under pressure, discharging the heated oil into a vapor separating zone and separating the same therein under pressure into vapors and unvaporized oil, removing the vapors for dephlegmation and condensation, separately removing the unvaporized oil and passing the same to a flashing zone maintained under lower pressure than said separating zone, partially distilling the unvaporized oil under the lower pressure in said flashing zone thereby forming additional vapors and residual oil, dephlegmating said additional vapors to condense heavier fractions thereof, heating the condensed heavier fractions to cracking temperature in an independent heating zone, and introducing separate portions of the thus heated fractions directly into said separating zone and to said flashing zone.

3. A hydrocarbon oil cracking process which comprises passing the oil through a heating zone and heating the same therein to cracking temperature under pressure, discharging the heated oil into a vapor separating zone and separating the same therein under pressure into vapors and unvaporized oil, removing the vapors, separately removing the unvaporized oil and passing the same to a flashing zone maintained under lower pressure than said separating zone, partially distilling the unvaporized oil under the lower pressure in said flashing zone thereby forming additional vapors and residual oil, fractionating the vapors removed from the separating zone and said additional vapors to condense a portion thereof, heating resultant reflux condensate to cracking temperature in a second heating zone and then introducing portions thereof into said separating zone and to said flashing zone.

4. A hydrocarbon oil cracking process which comprises heating the charging oil to cracking temperature under pressure while flowing in a restricted stream through a heating zone, discharging the heated oil into an enlarged reaction zone maintained under cracking conditions of temperature and pressure, separately removing vapors and unvaporized oil from the reaction zone, subjecting the vapors to primary dephlegmation and returning resultant reflux condensate to the heating zone, flash distilling the unvaporized oil in a flashing zone maintained under lower pressure than the reaction zone, combining the flashed vapors with the vapors uncondensed by the primary dephlegmation and dephlegmating the resultant mixture thereby forming additional reflux condensate, heating the latter to higher cracking temperature than the charging oil in a second heating zone and then introducing separate portions thereof into the reaction zone and the flashing zone, and finally condensing the vapors uncondensed by the last-mentioned dephlegmating step.

5. A hydrocarbon oil cracking process which comprises heating the charging oil to cracking temperature under pressure while flowing in a restricted stream through a heating zone, discharging the heated oil into an enlarged reaction zone maintained under cracking conditions of temperature and pressure, separately removing vapors and unvaporized oil from the reaction zone, subjecting the vapors to primary dephlegmation and returning resultant reflux condensate to the heating zone, flash distilling the unvaporized oil in a flashing zone maintained under lower pressure than the reaction zone, combining the flashed vapors with the vapors uncondensed by the primary deplegmation and dephlegmating the resultant mixture thereby forming additional reflux condensate, heating the latter to higher cracking temperature than the charging oil in a second heating zone and then introducing at least a portion thereof to the flashing zone, and finally condensing the vapors uncondensed by the last-mentioned dephlegmating step.

6. In a hydrocarbon oil cracking process, the steps which comprise heating the oil to cracking temperature in a heating zone and separating the same into vapors and unvaporized oil, subjecting the vapors to dephlegmation in a dephlegmating zone and thence to fractionation in a fractionating zone, flash distilling the unvaporized oil by pressure reduction in a flashing zone, introducing the flashed vapors to said fractionating zone to commingle with the cracked vapors being fractionated therein, removing reflux condensate from the fractionating zone and heating the same in a second heating zone to higher cracking temperature than is maintained on the first-mentioned heating zone, introducing resultant cracked products from said second heating zone into the flashing zone and returning reflux condensate from said dephlegmating zone to the first-mentioned heating zone.

7. A cracking process which comprises subjecting hydrocarbon oil to cracking conditions of temperature and pressure and separating the same into vapors and unvaporized oil, dephlegmating the vapors and returning resultant reflux to the cracking step, flash distilling the unvaporized oil by pressure reduction and fractionating resultant flashed vapors in admixture with the vapors uncondensed by said dephlegmation, cracking reflux condensate formed in this fractionating step at higher temperature than the first mentioned oil and contacting resultant vapors with the unvaporized oil undergoing flash distillation to assist the distillation thereof, and finally condensing the fractionated vapors.

8. In a hydrocarbon oil cracking process, the steps which comprise heating the oil to cracking temperature in a heating zone and separating the same into vapors and unvaporized oil, subjecting the vapors to dephlegmation in a dephlegmating zone and thence to fractionation in a fractionating zone, flash distilling the unvaporized oil by pressure reduction in a flashing zone, introducing the flashed vapors to said fractionating zone to commingle with the cracked vapors being fractionated therein, removing reflux condensate from the fractionating zone and heating the same in a second heating zone to higher cracking temperature than is maintained on the first-mentioned heating zone, and introducing resultant cracked products from said second heating zone into the flashing zone.

9. The method of converting higher boiling oils into lower boiling oils which comprises heating a confined flowing stream of hydrocarbon oil to cracking temperature under superatmospheric pressure, passing the stream of highly heated oil into an enlarged zone wherein a cracking temperature is maintained and vapors separate from liquids, passing separated liquids from said reaction zone into a separate enlarged zone, maintained under lower pressure than the first-named zone, and flash distilling the same therein by pressure reduction, subjecting resulting flashed vapors to fractional condensation to separate vapors of desired boiling range from heavier fractions as condensate, passing condensate so formed through a separate heating zone wherein it is raised to a cracking temperature, introducing resulting highly heated condensate into the first-named enlarged zone and into said enlarged zone second mentioned, and condensing the fractionated vapors to form a desired distillate.

10. A cracking process which comprises heating hydrocarbon oil to cracking temperature under pressure while flowing in a restricted stream through a heating zone, introducing the heated oil to a reaction zone maintained under cracking conditions of temperature and pressure and effecting further conversion therein, removing liquid reaction products from the reaction zone and flash distilling the same in a flashing zone by pressure reduction, fractionating the flashed vapors and subjecting resultant reflux condensate to cracking conditions of temperature and pressure independently of the first-named oil, introducing separate portions of the heated reflux condensate into the reaction zone and into the flashing zone, and finally condensing the fractionated vapors.

11. A cracking process which comprises heating hydrocarbon oil to cracking temperature under pressure while flowing in a restricted stream through a heating zone, introducing the heated oil to a reaction zone maintained under cracking conditions of temperature and pressure and effecting further conversion therein, removing liquid reaction products from the reaction zone and flash distilling the same in a flashing zone by pressure reduction, fractionating the flashed vapors and subjecting resultant reflux condensate to independently controlled cracking conditions of temperature and pressure while flowing in a restricted stream through a second heating zone, discharging heated products from the second heating zone into the reaction zone and into the flashing zone, and finally condensing the fractionated vapors.

12. A cracking process which comprises heating hydrocarbon oil to cracking temperature under pressure while flowing in a restricted stream through a heating zone, introducing the heated oil to a reaction zone maintained under cracking conditions of temperature and pressure and separating vapors from unvaporized oil therein, removing unvaporized oil from the reaction zone and flash distilling the same in a flashing zone by pressure reduction, separately removing vapors from the reaction zone and dephlegmating the same to condense fractions thereof heavier than gasoline, returning resultant reflux condensate to the heating zone, further fractionating the dephlegmated vapors and subjecting lighter reflux condensate thus formed to independently controlled cracking conditions of temperature and pressure while flowing in a restricted stream through a second heating zone, introducing heated products formed in the second heating zone into the reaction zone and the flashing zone, and finally condensing the fractionated vapors.

JOSEPH G. ALTHER.